(12) United States Patent
Hibino

(10) Patent No.: US 10,890,314 B2
(45) Date of Patent: Jan. 12, 2021

(54) IN-ROOM ILLUMINATION APPARATUS FOR MOVABLE STRUCTURE, AND MOVABLE STRUCTURE

(71) Applicant: PANASONIC INTELLECTUAL PROPERTY MANAGEMENT CO., LTD., Osaka (JP)

(72) Inventor: Kota Hibino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/577,737

(22) Filed: Sep. 20, 2019

(65) Prior Publication Data
US 2020/0103100 A1 Apr. 2, 2020

(30) Foreign Application Priority Data
Sep. 27, 2018 (JP) .................................. 2018-182782

(51) Int. Cl.
*F21V 21/04* (2006.01)
*F21V 21/30* (2006.01)
*F21V 21/08* (2006.01)

(52) U.S. Cl.
CPC .............. *F21V 21/04* (2013.01); *F21V 21/08* (2013.01); *F21V 21/30* (2013.01)

(58) Field of Classification Search
None
See application file for complete search history.

(56) References Cited

U.S. PATENT DOCUMENTS

| 1,687,821 | A | * | 10/1928 | Aldeen | B60Q 1/245 |
| | | | | | 362/322 |
| 5,377,087 | A | * | 12/1994 | Yoon | F21V 21/30 |
| | | | | | 362/148 |
| 5,404,297 | A | * | 4/1995 | Birk | B64D 11/00 |
| | | | | | 362/421 |
| 7,434,962 | B2 | | 10/2008 | Stache | |
| 8,602,614 | B2 | * | 12/2013 | Schultheis | B60Q 3/82 |
| | | | | | 362/275 |
| 9,447,953 | B2 | * | 9/2016 | Lawlor | F21V 21/14 |
| 9,927,106 | B2 | * | 3/2018 | Hsieh | F21V 14/02 |
| 2007/0297182 | A1 | | 12/2007 | Stache | |

(Continued)

FOREIGN PATENT DOCUMENTS

JP 2009-541941 11/2009

*Primary Examiner* — Elmito Breval
(74) *Attorney, Agent, or Firm* — Greenblum & Bernstein, P.L.C.

(57) ABSTRACT

An in-room illumination apparatus for a movable structure includes: a light source; a holder that holds the light source; and a bridge that presses the light source against the holder. The light source includes a spherical housing and a light emitting element. The bridge includes, at a center part, a first contact region which is configured to be in contact with an outer surface of the light source at all times. The light source includes, at the outer surface, a light source-side contact region that is configured to be in contact with the first contact region. At least one recess and at least one protrusion are in the first contact region and in the light source-side contact region. A number of recesses and protrusions in the first contact region is different than a number of recesses and protrusions in the light source-side contact region.

15 Claims, 15 Drawing Sheets

(56) References Cited

U.S. PATENT DOCUMENTS

2009/0262538 A1* 10/2009 Ono .................. B60Q 3/44
362/269
2017/0248291 A1* 8/2017 Hsu .................. F21S 8/063

* cited by examiner

IN-ROOM ILLUMINATION APPARATUS FOR MOVABLE STRUCTURE, AND MOVABLE STRUCTURE

CROSS REFERENCE TO RELATED APPLICATION

This application claims priority to Japanese Patent Application No. 2018-182782 filed on Sep. 27, 2018, which is incorporated herein by reference in its entirety including the specification, claims, drawings, and abstract.

TECHNICAL FIELD

The present disclosure relates to an in-room illumination apparatus for a movable structure, and also to a movable structure.

BACKGROUND

In the related art, there is known, as an in-room illumination apparatus for a movable structure, which is provided near a seat of a railroad vehicle, an air plane, or the like, a structure in which a spherical housing of a light source unit is held by a holder made of a metal, and a short-tube portion is provided at a part of the housing protruding from a circular opening of the holder. Inside the short-tube portion, a lens unit of the light source unit is placed, and light of the light source unit is emitted from the opening of the short-tube portion. A leaf spring is provided at a side, of the holder, opposite to the light emission side, and presses an outer surface of the housing toward the light emission side. With this structure, the housing can be rotated while being pressed by the leaf spring in a predetermined range. Because of this, the user can touch the light source unit with their hand from the light emission side, and can rotate the light source unit.

JP 2009-541941 A discloses an illumination assembly (in-room illumination apparatus for a movable structure) incorporated into an overhead console of an automobile. In this illumination assembly, a lamp (light source unit) having a light emitting element inside thereof is placed inside a housing and a bezel, and a pivot (protrusion) protruding on an upper side of a lamp cover attached to an upper side of the lamp is pressed against a recess of the housing.

In the structure of the in-room illumination apparatus for the movable structure of the related art described above, if a holding force of an optical axis of the light source unit is increased by adjusting the leaf spring, a force necessary for the user to rotate the light source unit is also increased, resulting in reduction of the usability. On the other hand, if the holding force of the optical axis is reduced, the light source unit becomes unstable, and vibration endurance is reduced. Thus, realization of a structure is desired in which a direction of the optical axis can be changed while not excessively increasing an operation force of the user, and the holding force of the optical axis after the change can be increased. The structure described in JP 2009-541941 A also has a disadvantage similar to the structure of the related art described above.

SUMMARY

According to one aspect of the present disclosure, there is provided an in-room illumination apparatus for a movable structure, comprising: a light source; a holder that holds the light source; and a bridge that is connected to the holder and presses the light source against the holder, wherein the light source includes a spherical housing and a light emitting element, the light emitting element being inside the spherical housing, the bridge includes, at a center part, a first contact region which is configured to be in contact with an outer surface of the light source at all times during use of the in-room illumination apparatus, the light source includes, at the outer surface, a light source-side contact region that is configured to be in contact with the first contact region during the use of the in-room illumination apparatus, at least one recess and at least one protrusion, which are configured to fit together, are in the first contact region and in the light source-side contact region, and a number of the at least one recess and the at least one protrusion in the first contact region is different than a number of the at least one recess and the at least one protrusion in the light source-side contact region.

According to another aspect of the present disclosure, there is provided a movable structure comprising the in-room illumination apparatus for the movable structure of the present disclosure, wherein the in-room illumination apparatus for the movable structure is placed at an upper side of a seat.

According to the in-room illumination apparatus for the movable structure and the movable structure of the present disclosure, the holding of the optical axis can be facilitated by a fitting mechanism between the recess and the protrusion, and the vibration endurance can be improved. In addition, when the light source unit is to be rotated, the recess and the protrusion can be released from the fitted state, such that the light source unit can be easily rotated while providing a click feeling to intermittently increase the holding force according to a position during movement. With this configuration, the direction of the optical axis can be changed while not excessively increasing the operation force of the user, and the holding force of the optical axis after the change can be improved.

BRIEF DESCRIPTION OF DRAWINGS

The figures depict one or more implementations in accordance with the present teaching, by way of example only, not by way of limitations.

In the figures, like reference numerals refer to the same or similar elements.

Figure 1:
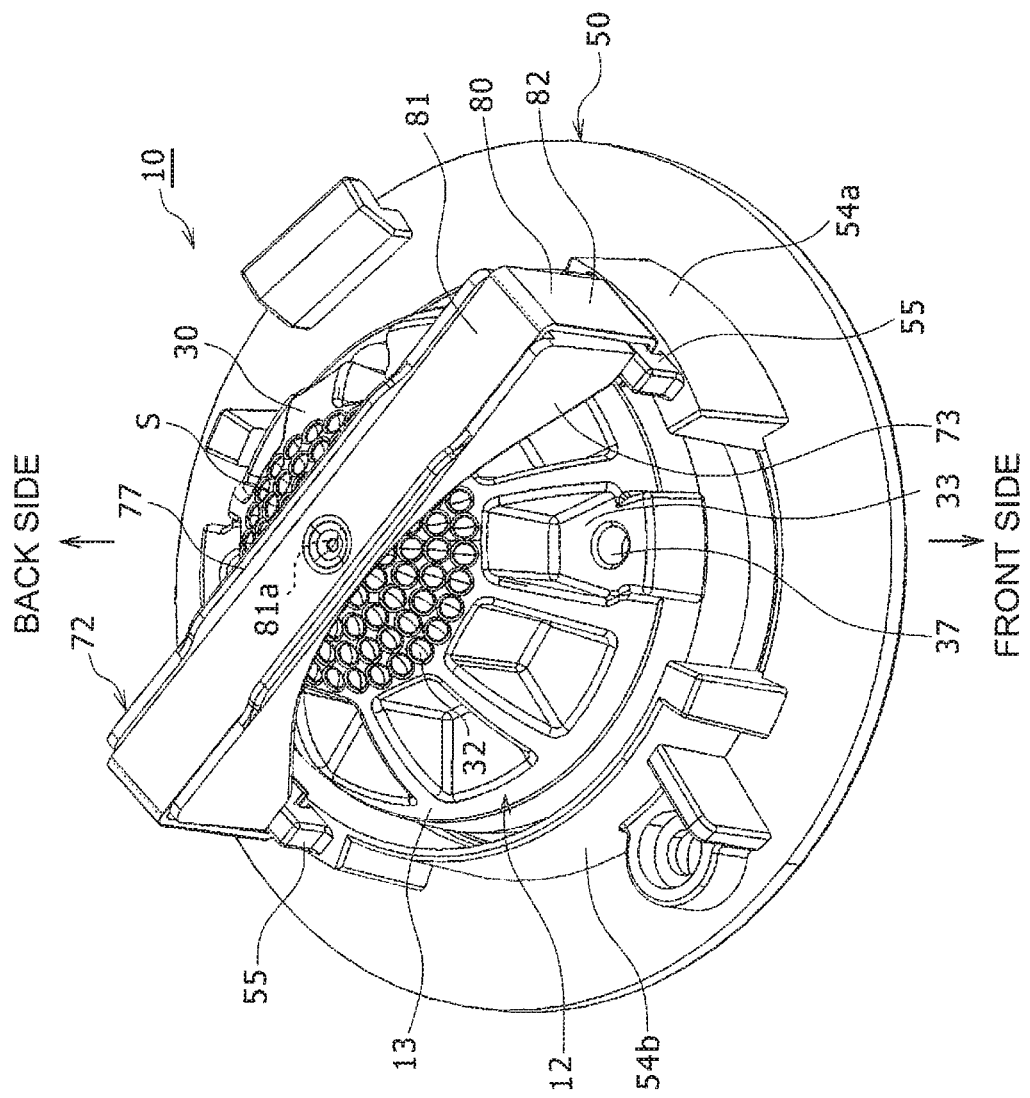
Figure 2:
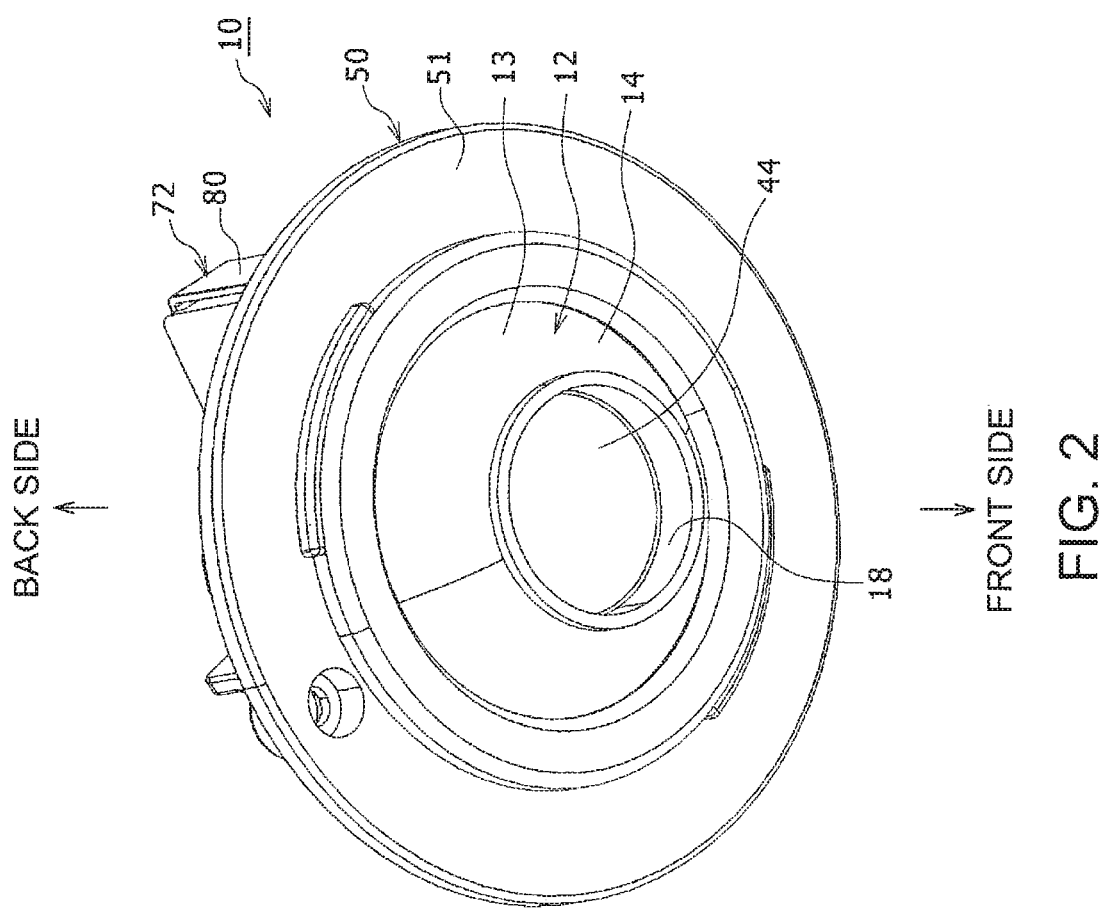
Figure 3:
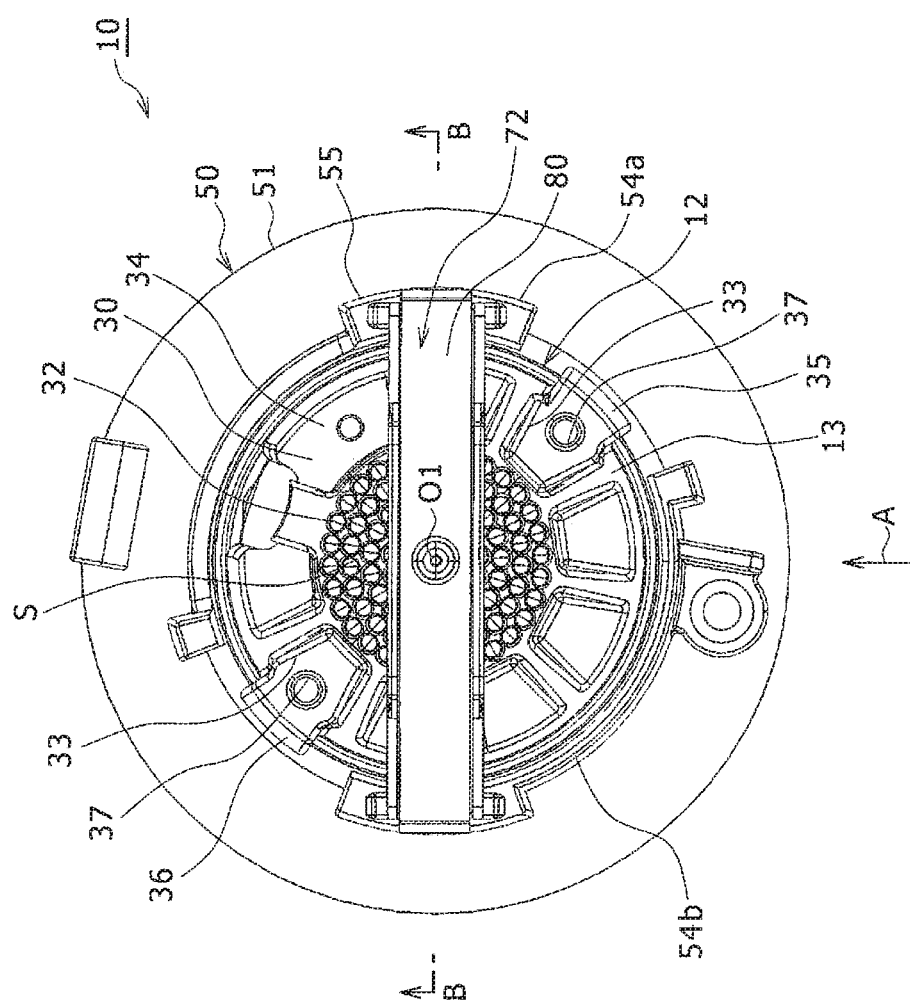
Figure 4:
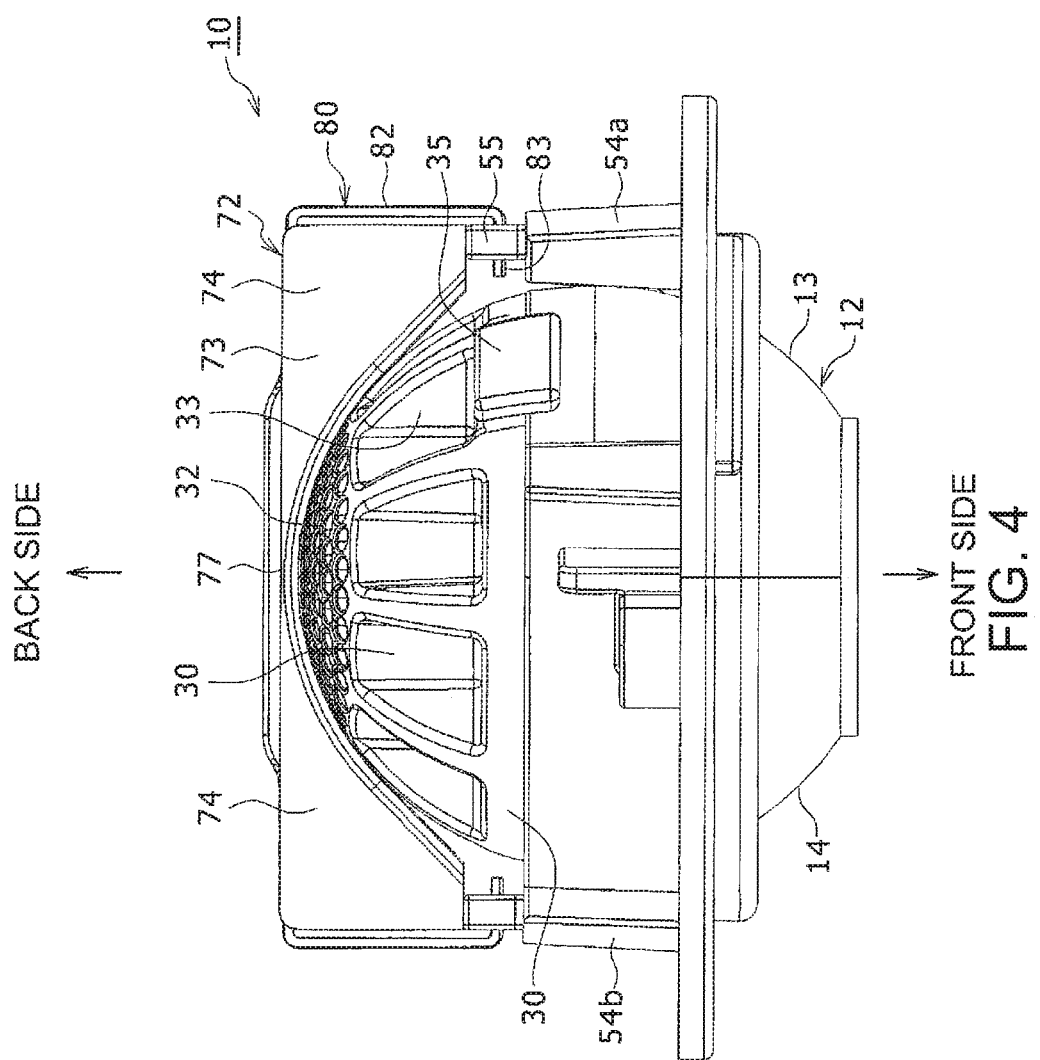
Figure 5:
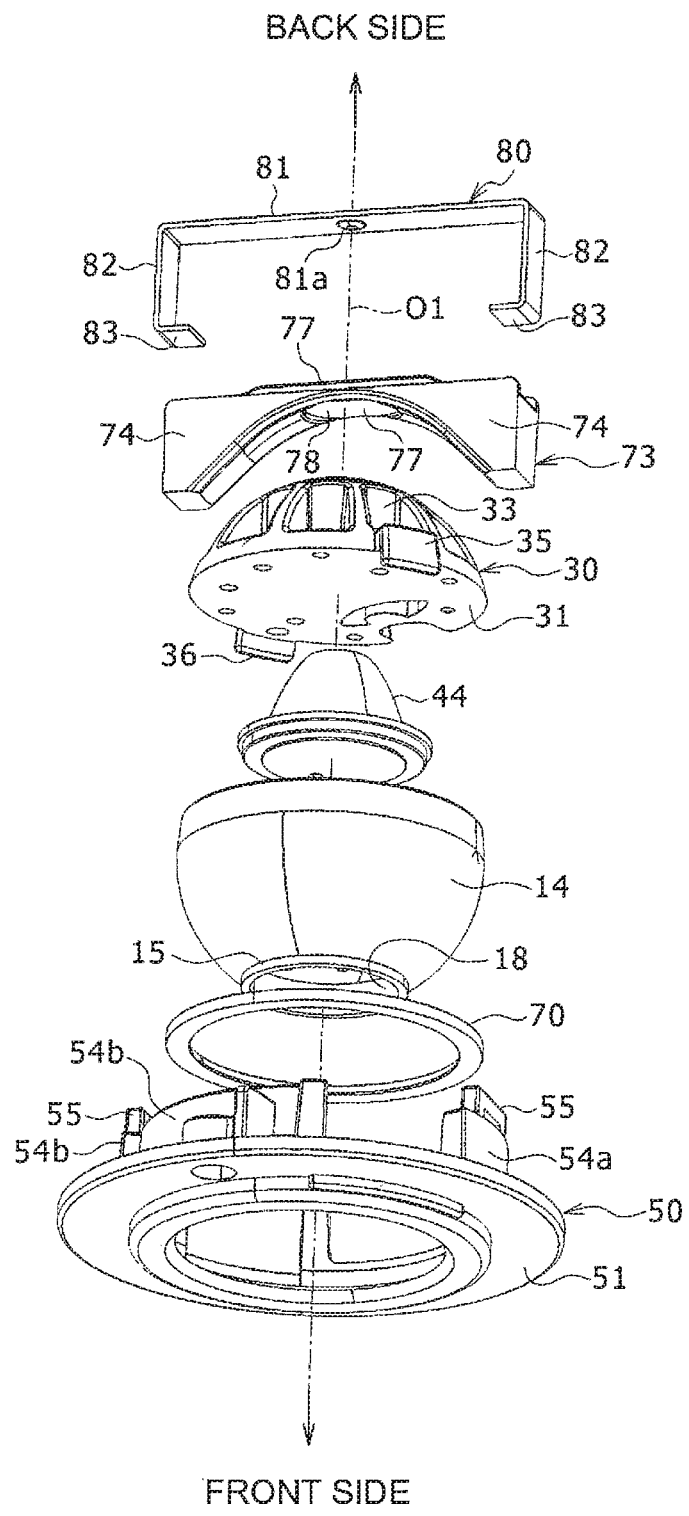
Figure 6:
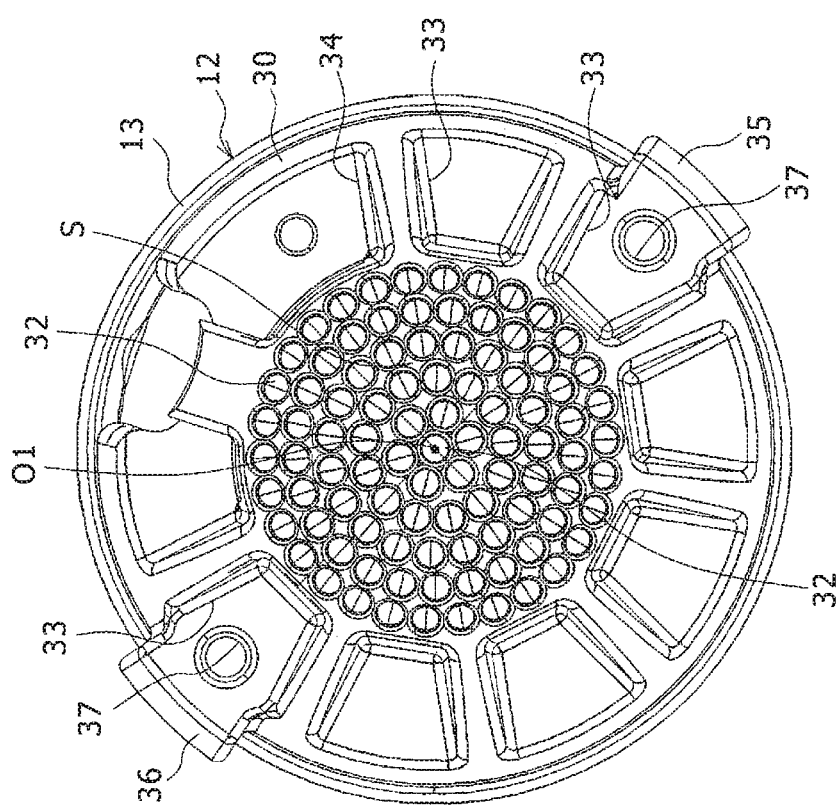
Figure 7:
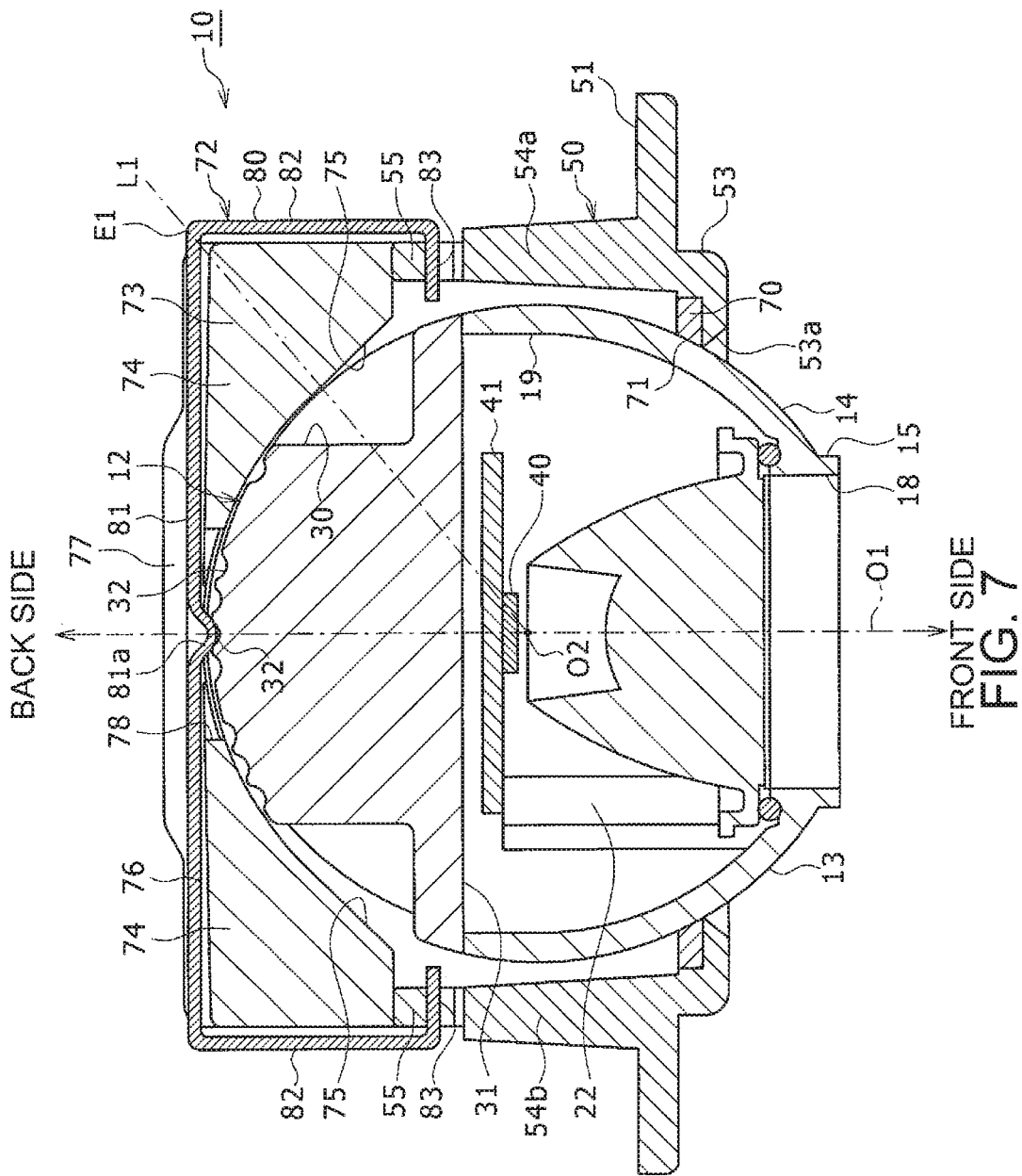
Figure 8:
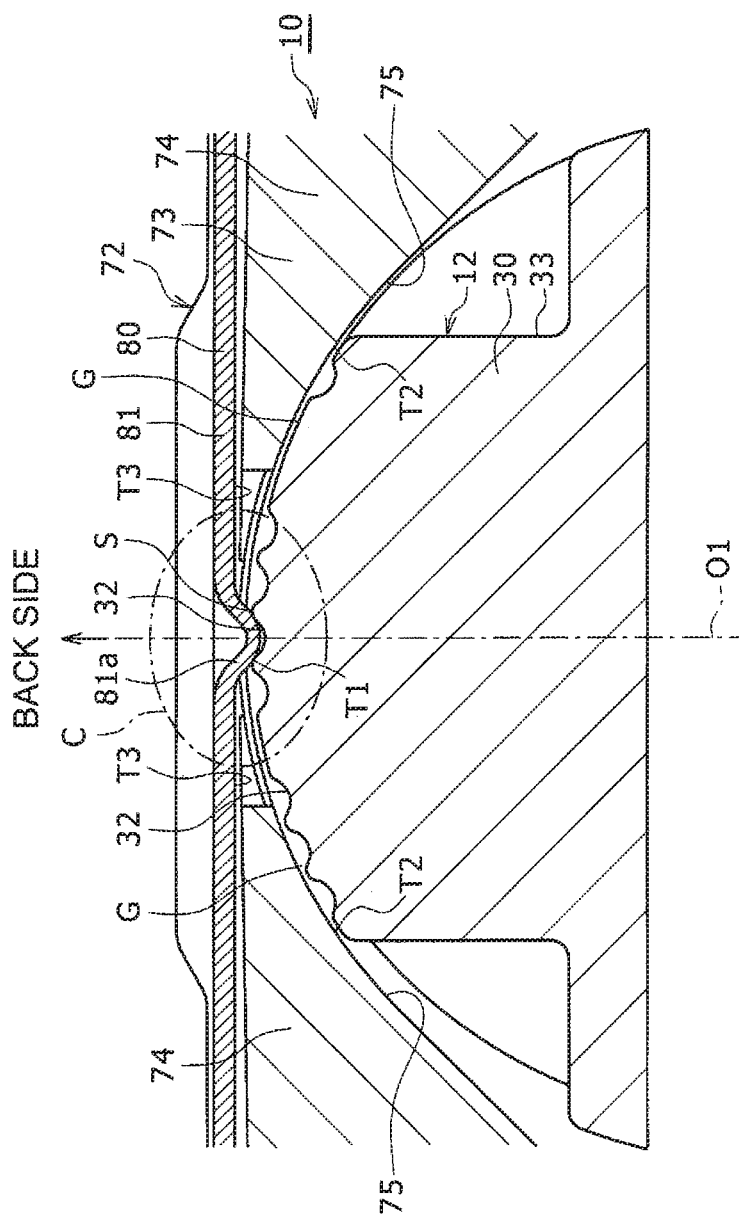
Figure 9:
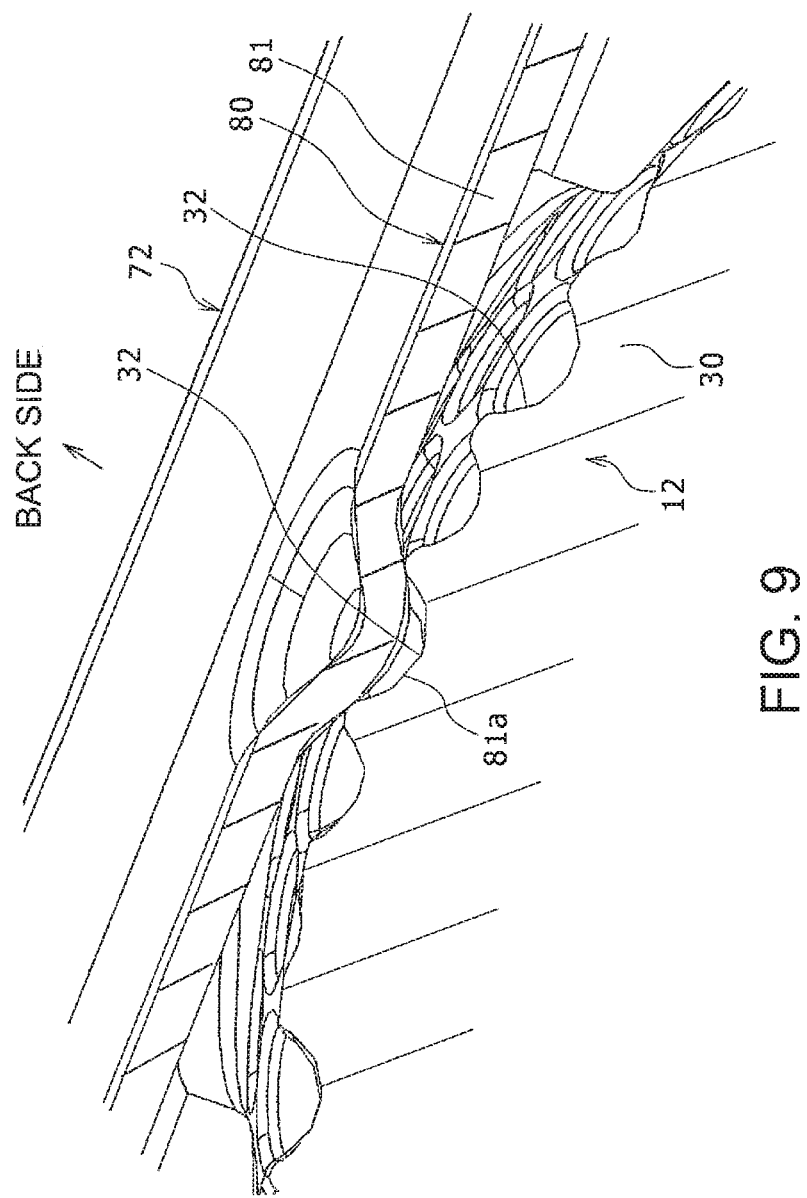
Figure 10:
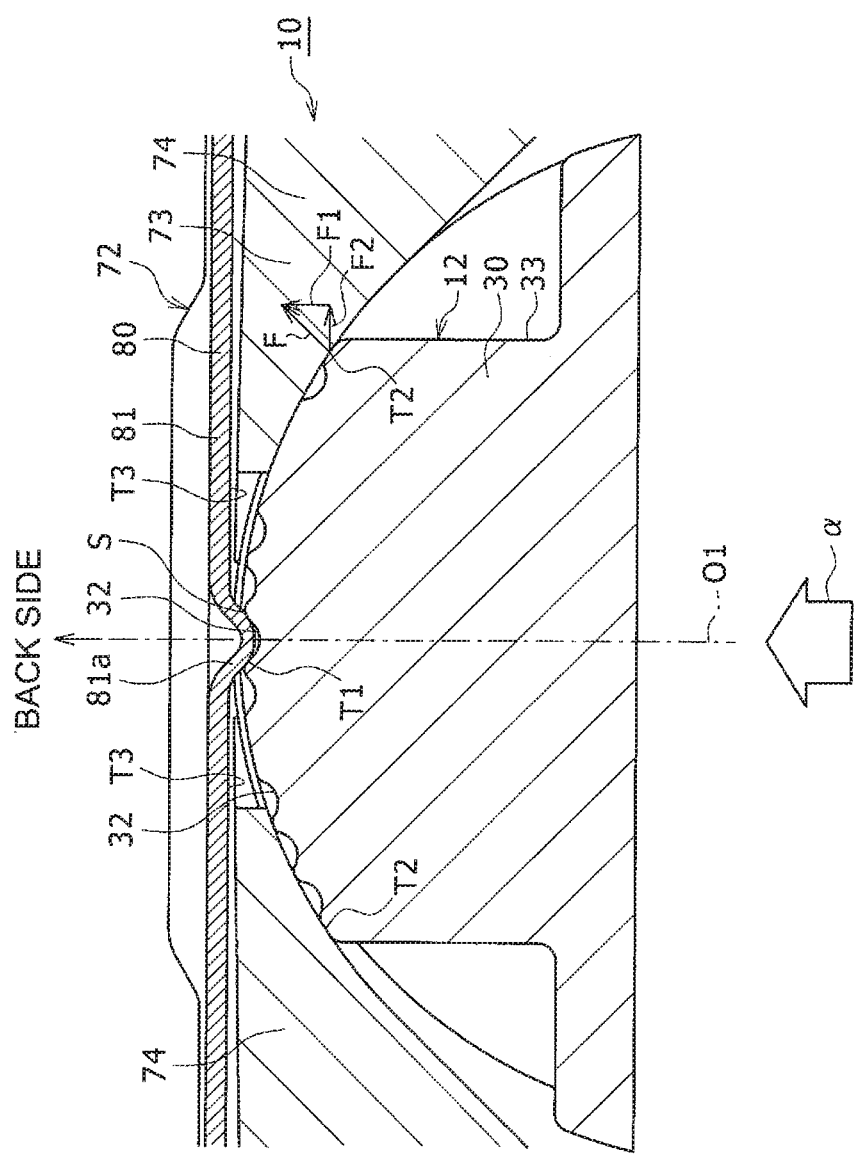
Figure 11:
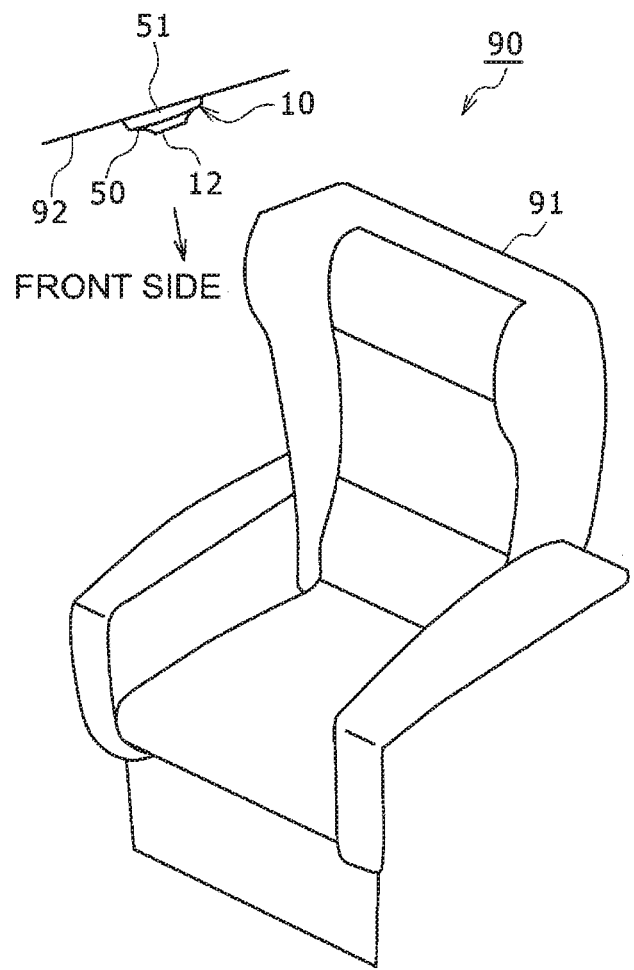
Figure 12:
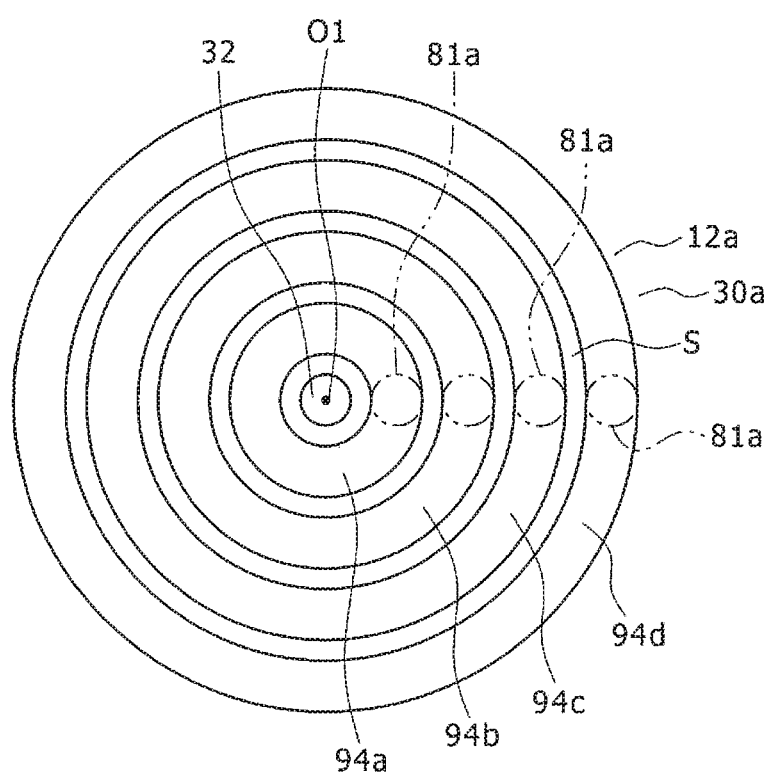
Figure 13:
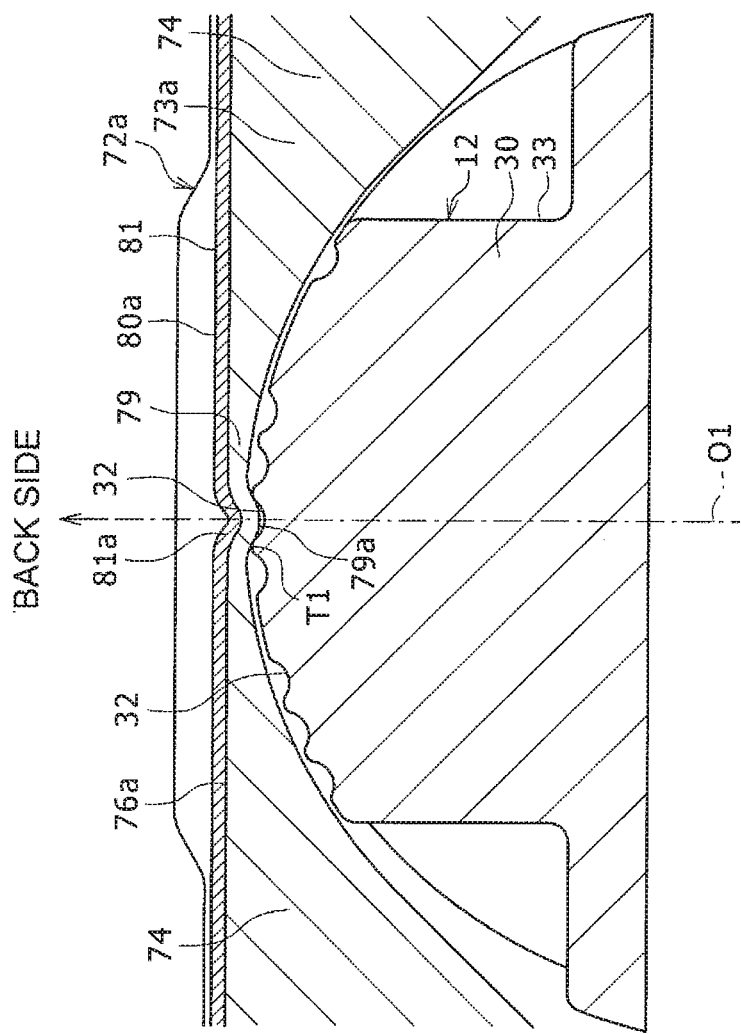
Figure 14:
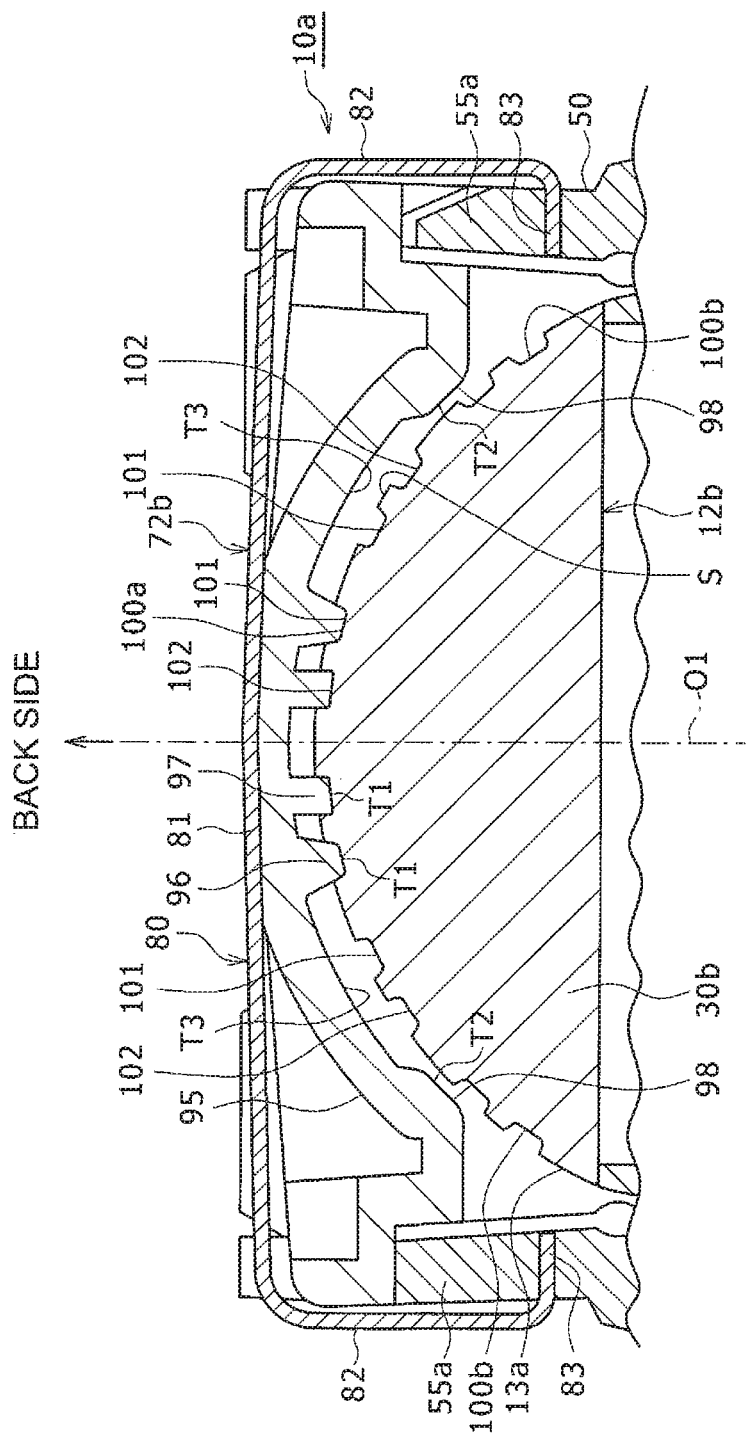
Figure 15:
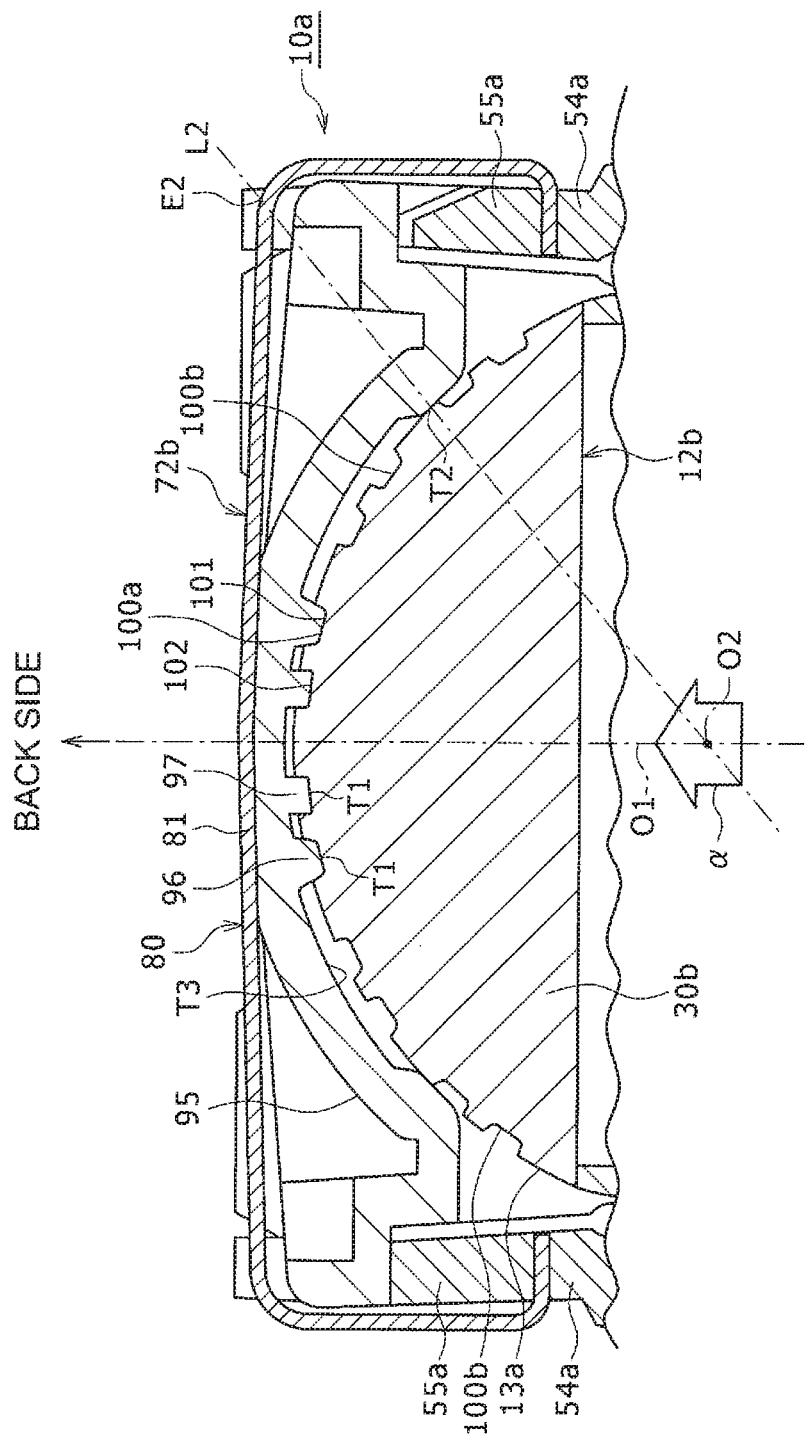

An embodiment of the present disclosure will be described based on the following figures, wherein:

FIG. 1 is a perspective diagram of an in-room illumination apparatus for a movable structure according to an embodiment of the present disclosure, viewed from a back side, opposite to a direction of emission of light, FIG. 2 is a perspective diagram of an in-room illumination apparatus for a movable structure according to an embodiment of the present disclosure, viewed from a front side, which is a direction of emission of light;

FIG. 3 is a diagram of an in-room illumination apparatus for a movable structure according to an embodiment of the present disclosure, viewed from a back side;

FIG. 4 is a diagram showing the structure of FIG. 3 in a direction of an arrow A:

FIG. 5 is an exploded perspective diagram of an in-room illumination apparatus for a movable structure according to an embodiment of the present disclosure, viewed from a front side:

FIG. 6 is a diagram of a light source unit of FIG. 1, viewed from a back side;

FIG. 7 is a B-B cross sectional diagram of FIG. 3;

FIG. 8 is an enlarger diagram of an upper half of FIG. 7;

FIG. 9 is an enlarged perspective diagram of a C part of FIG. 8;

FIG. 10 is a diagram corresponding to FIG. 8, and showing a state in which a light source unit of an in-room illumination apparatus for a movable structure is pressed to a back side, and contacts a second contact region of a holder;

FIG. 11 is a diagram showing a relationship between a seat and an in-room illumination apparatus for a movable structure in a movable structure according to an embodiment of the present disclosure;

FIG. 12 is a diagram of a center part of an outer surface of a light source body of a light source unit in an illumination apparatus for a movable structure according to an alternative configuration of an embodiment of the present disclosure, viewed from a back side;

FIG. 13 is a diagram corresponding to FIG. 8, and showing an illumination apparatus for a movable structure according to an alternative configuration of an embodiment of the present disclosure;

FIG. 14 is a diagram corresponding to an upper half of FIG. 7, and showing an illumination apparatus for a movable structure according to an alternative configuration of an embodiment of the present disclosure; and FIG. 15 is a diagram corresponding to FIG. 14, and showing a state in which a light source unit is pressed toward a back side and contacts a second contact region of a holder in an alternative configuration of an embodiment of the present disclosure.

DESCRIPTION OF EMBODIMENTS

An in-room illumination apparatus for a movable structure according to an embodiment of the present disclosure will now be described in detail with reference to the drawings. The drawings referred to in the description of the embodiment are schematically shown, and thus, a size, ratio, or the like of each constitutent element are to be determined in consideration of the following description. In the following description, a specific shape, a specific material, a specific number, etc. are exemplary for facilitating understanding of the present disclosure, and may be suitably changed according to a specification of an illumination apparatus. In the following, elements similar over all drawings are assigned the same reference numerals for description.

FIG. 1 is a perspective diagram of an in-room illumination apparatus 10 for a movable structure according to an embodiment of the present disclosure, viewed from a back side, which is opposite to a light emission direction. FIG. 2 is a perspective diagram of the in-room illumination apparatus 10 for the movable structure, viewed from a front side which is the light emission direction. FIG. 3 is a diagram showing the in-room illumination apparatus 10 for the movable structure, viewed from the back side. FIG. 4 is a diagram showing the structure of FIG. 3, viewed in a direction of an arrow A. FIG. 5 is an exploded perspective diagram of the in-room illumination apparatus 10 for the movable structure, viewed from the front side. FIG. 6 is a diagram of a light source unit of FIG. 1, viewed from the back side. FIG. 7 is a B-B cross sectional diagram of FIG. 3. FIG. 8 is an enlarged view of an upper half of FIG. 7. FIG. 9 is an enlarged perspective diagram of a C part of FIG. 8. In the following, the in-room illumination apparatus 10 for the movable structure is also described simply as an illumination apparatus 10.

As shown in FIGS. 1 to 8, the illumination apparatus 10 comprises a light source unit 12, a holder 50, a sliding ring 70 (FIGS. 5 and 7), and a pressurizer 72. The light source unit 12 corresponds to the light source.

The illumination apparatus 10 is placed near a seat 91 (FIG. 11) of an airplane 90 (FIG. 11) which is a movable structure. Specifically, the illumination apparatus 10 is embedded and attached on an attachment hole provided at an upper side of the seat 91 for a passenger in the airplane 90, within a range of reach of a hand of a user seated on the seat 91, and illuminates a lower side. This will be described later with reference to FIG. 11. In the present specification, for the purpose of explanation, in a state where the illumination apparatus 10 is attached, a light emission side of the illumination apparatus 10 is described as a "front side", and an opposite side thereof is described as a "back side".

The light source unit 12 includes an approximate spherical housing 13, a light emitting element 40 (FIG. 7), and a lens 44 (FIG. 2). The housing 13 is formed by combining a cover 14 at the front side (lower side of FIGS. 4 and 5), and a light source body 30 at the back side (upper side of FIGS. 4 and 5). As shown in FIGS. 5 and 7, the cover 14 has an inner surface and an outer surface both having a semi-spherical shape, and includes a short-tube portion 15 which protrudes toward the front side. The cover 14 is formed from, for example, a resin which has a light weight and which is superior in thermal endurance.

At a tip of the short-tube portion 15, which is a front side end, an opening 18 having a circular shape is formed. An opening 19 is also formed on a back side end of the cover 14. A plurality of attachment protrusions 22 (FIG. 7) are formed on the inner surface of the cover 14, and a screw hole (not shown) in a direction parallel to a center axis O1 is formed in the attachment protrusion 22.

As shown in FIGS. 5~7, the light source body 30 is formed in an approximate semi-spherical shape, and has a flat surface portion 31 along a plane orthogonal to the center axis O1 at the most part of the front side end. Further, as shown in FIGS. 1, 3, and 6, a plurality of recesses 32 are placed approximately uniformly in a light source-side contact region S which is a portion near a center of an outer surface of the light source body 30. Each of the plurality of recesses 32 has a semi-spherical shape. One of the plurality of recesses 32 at the center is placed at a center of the outer surface of the light source body 30, and the other recesses 32 are placed on a plurality of circles having the same center axis, around the center recess 32. As will be described later, a first contact region T1 (FIG. 8) placed at a center part of the pressurizer 72 to be described later is in contact with the light source-side contact region S at all times. Each of the plurality of recesses 32 can be fitted with a protrusion 81a formed in the first contact region T1.

Grooves 33 and 34 are formed at a plurality of positions in a circumferential direction of an outer circumferential surface of a front side end of the light source body 30. Two protrusions 35 and 36 protruding in a direction orthogonal to the center axis O1 are formed and placed at two positions, on the outer circumferential surface of the front side end of the light source body 30, having phases different from each other by 180 degrees. Sizes of the two protrusions 35 and 36 are approximately equal to each other. Back side surfaces of the two protrusions 35 and 36 are continuous in a flat surface shape from front side surfaces of two grooves 33. A tip of each of the protrusions 35 and 36 protrudes more toward the front side than the flat surface portion 31 of the front side end. An outer shape of the tip of each of the protrusions 35 and 36, viewed from the side, is quadrangular. The protrusions 35 and 36 are positioned approximately on a great circle, on the spherical surface portion formed by the light source body 30 and the outer surface of the cover 14, having the largest distance from the center. The two protrusions 35 and 36 are used to restrict a range of movement of the housing 13 with respect to the holder 50 to be described later. The light source body 30 is formed from, for example, a metal, desirably by aluminum which is lighter than iron or casting of an alloy thereof.

In the front side end surface of at least a part of the groove 33, of the plurality of grooves 33 and 34 of the light source body 30, a hole 37 which penetrates through in a direction parallel to the center axis O1 is formed. A bolt (not shown) passing through the hole 37 is coupled to a screw hole formed on the attachment protrusion 22 of the cover 14 shown in FIG. 7. With this configuration, the cover 14 and the light source body 30 are integrally fixed, and the outer surface of the cover 14 and the outer surface of the light source body 30 form a part of a spherical surface having matching center point O2 (FIG. 7). In this state, the two protrusions 35 and 36 protrude from the outer surface of the housing 13.

The light emitting element 40 shown in FIG. 7 is placed inside the housing 13. The light emitting element 40 is mounted on a substrate 41. The light emitting element 40 is, for example, an LED (light emitting diode) which emits white light. The substrate 41 is, for example, a ceramic substrate, a resin substrate, a metal-base substrate, or the like. A power supply unit (not shown) is connected to the substrate 41 through a lead wiring (not shown). Electric wiring (not shown) is connected to the power supply unit, and electric power of an alternating current power supply is supplied through a connector connected to the electric wiring. The power supply unit converts the alternating current electric power to direct current electric power, and then supplies the converted electric power to the light emitting element 40. The substrate 41 is attached to the flat surface portion 31 of the light source body 30 via a sheet member (not shown) such as a resin sheet, while the light emitting element 40 is placed at the front side. In FIG. 5, the showing of the light emitting element 40 and the substrate 41 is omitted.

The lens 44 shown in FIGS. 5 and 7 is placed inside the housing 13, at a front side of the light emitting element 40. Specifically, the lens 44 is placed at a position where the light emitted from the light emitting element 40 is transmitted and emitted. The lens 44 is held, for example, at an inner side of a lens holder (not shown) having a circular tubular shape. The lens holder is attached to the front side end of the light source body 30 by a bolt or the like, so that the lens holder is fixed on the light source body 30.

The lead wiring connected to the substrate 41 extends through a hole (not shown) formed on the light source body 30, and to the outside. The lead wiring is connected to the electric wiring through the power supply unit, and the electric wiring is connected to an external alternating current power supply through a connector.

The holder 50 includes a ring-shape circular plate portion 51, and two walls 54a and 54b protruding from ends on an inner circumferential side of the back side surface of the circular plate portion 51. The two walls 54a and 54b are placed separated from each other in the circumferential direction of the holder 50. The holder 50 holds the light source unit 12 at an inside thereof. A short-tube portion 53 having an approximate L-shape cross section is formed from an inner circumferential side end of the front side surface of the circular plate portion 51. The short-tube portion 53 has, on the front side end thereof, a circular collar 53a which protrudes in the inner circumferential side. The holder 50 is formed from, for example, a metal, for example, aluminum or casting of an alloy thereof. The holder 50 may alternatively be formed from a resin.

The sliding ring 70 is placed on the circular collar 53a (on back side surface) of the short-tube portion 53 of the holder 50. The sliding ring 70 is a resin sheet, and a curved surface portion 71 having an arc shape cross section is formed on an inner circumferential surface thereof. The curved surface portion 71 has a shape approximately matching the spherical surface of the outer surface of the cover 14 of the light source unit 12. The curved surface portion 71 has its diameter increased toward the back side end. With this configuration, the curved surface portion 71 catches the outer surface of the cover 14 and slidably supports the light source unit 12.

Of the back side ends of the two walls 54a and 54b of the holder 50, at two positions having phases different from each other by 180 degrees, two gate portions 55 are formed in a protruding manner. Each gate portion 55 has two parallel legs and a straight line portion connecting back side ends of the two legs.

The pressurizer 72 is formed by combining a resin structure 73 and a leaf spring 80. The pressurizer 72 is a bridge member connected to the holder 50. The first contact region T1 (FIG. 8), which is configured to be in contact with the light source-side contact region S (FIG. 8) of the outer surface of the light source unit 12 at all times during use of the illumination apparatus 10, is placed at a center part of the pressurizer 72, and one protrusion 81a is formed in the first contact region T1. Specifically, as shown in FIGS. 4 and 7, in the resin structure 73, two end load receiving portions 74 having a triangular column shape and two connection portions 77 which connect the two end load receiving portions 74 at respective ends in a width direction of the resin structure 73 (direction into and out of the page of FIGS. 4 and 7) are integrally formed. At an intermediate part in the width direction at a center part in a longitudinal direction of the resin structure 73 (left and right direction of FIGS. 4 and 7), a hole 78 penetrating in the direction of the center axis O1 is formed. As shown in FIG. 7, a front side surface of the end load receiving portion 74 has a curved surface portion 75 having an arc shape cross section approximately matching the outer shape of the spherical surface portion of the light source body 30 at the light source unit 12. The curved surface portion 75 is a second contact region T2. On the back side of the resin structure 73, a groove 76 for locking the leaf spring 80 is formed. The resin structure 73 is formed from, for example, a resin such as polyacetal (POM).

The leaf spring 80 has an approximate C-shape cross section, with an elongated body plate portion 81 and two end plate portions 82 bent in an approximate right angle from ends in the longitudinal direction of the body plate portion 81 toward the front side. At a center part of the body plate portion 81, the protrusion 81a is formed by deforming the structure in a mountain shape to protrude toward the front side. The first contact region T1 is a front side surface of the center part in the longitudinal direction of the body plate portion 81, and the protrusion 81a is formed on this front side surface. A number of the protrusion 81a is one, and is significantly smaller than a number of the recesses 32 formed in the light source-side contact region S.

At tips of the two end plate portions 82, locking portions 83 are formed by bending the structure in an approximate right angle in a direction toward each other. The leaf spring 80 is integrated with the resin structure 73 in a state of being locked in the groove 76 of the resin structure 73, and the two end plate portions 82 of the leaf spring 80 are attached to the two gate portions 55 of the holder 50 so as to sandwich the two gate portions 55 from the outer side. In this state, the end load receiving portion 74 of the resin structure 73 is pressed against the back side end of the gate portion 55. In addition, the locking portion 83 is locked to the straight line portion of the gate portion 55. The protrusion 81a of the leaf spring 80 is configured to be in contact with the light source-side contact region S of the outer surface of the light source body 30 at all times during use of the illumination apparatus 10. For example, the protrusion 81a protrudes through the hole 78 at the center part of the resin structure 73 to the front side, and is fitted to one recess 32 of the back side end of the light source body 30 and pressed against the opening end thereof. Therefore, the light source unit 12 is pressed by the protrusion 81a of the pressurizer 72 and the sliding ring 70, and is held in a manner to allow sliding and rotation. With this configuration, the pressurizer 72 presses the light source unit 12 against the holder 50. Moreover, the two protrusion 35 and 36 protruding from the outer surface of the light source unit 12 are placed in gaps in the circumferential direction of the two walls 54a and 54b formed on the holder 50, so that movement of the light source unit 12 within a predetermined range is enabled. Further the front side end of the light source unit 12 protrudes from the opening of the front side end of the holder 50, and, because the protruded portion may be touched by the user with their hand and the light source unit 12 may thus be rotated, the direction of the optical axis of the light source unit 12 can be arbitrarily changed.

In addition, as shown in FIG. 8, a gap G is formed in a normal state, between the end load receiving portion 74 of the resin structure 73 and the outer surface of the light source body 30.

FIG. 10 is a diagram corresponding to FIG. 8, showing a state in which the light source unit 12 of the illumination apparatus 10 is pressed toward the back side and the light source unit 12 contacts a second contact region T2 of the holder 50 (FIG. 7). From the state shown in FIG. 8, when the user presses the light source unit 12 with their hand toward the back side (direction of an arrow a in FIG. 10), the pressurizer 72 is deformed, the gap G (FIG. 8) described above disappears, and the outer surface of the light source body 30 is pressed against the second contact region T2 of the end load receiving portion 74. With this process, the second contact region T2 contacts the outer surface of the light source unit 12 at a portion of the arc shape cross section, in accordance with the deformation of the pressurizer 72. Because of this, as will be described later, the strength can be improved in comparison to a case where the resin structure 73 receives the force from the light source body 30 only in the direction of the center axis O1.

The second contact region T2 is placed at a portion nearer to an end in the longitudinal direction (left and right direction in FIGS. 7, 8, and 10) of the pressurizer 72 than is the first contact region T1, and is separated from the light source unit 12 in the normal state, that is when the pressurizer 72 is not deformed. In a state where the second contact region T2 is in contact with the outer surface of the light source unit 12, a non-contact region T3 separated from the outer surface of the light source unit 12 is placed between the first contact region T1 and the second contact region T2 on the front side of the pressurizer 72.

The plurality of recesses 32 formed on the light source body 30 are placed at portions, of the outer surface of the light source body 30, which can contact the first contact region T1 of the pressurizer 72.

Further, as shown in FIG. 7, in a case of a home position in which the optical axis of the light emitting element 40 matches the center axis O1 of the illumination apparatus 10, the second contact region T2 (FIG. 10) is placed the back side, which is the opposite side of the light emission side, with respect to a plane L1 passing through an outermost end E1 in the longitudinal direction of the back side at the center in the width direction of the pressurizer 72 (direction into and out of the page of FIG. 7) from the center point O2 of the spherical surface portion of the outer surface of the housing 13.

As shown in FIG. 11, the illumination apparatus 10 having such a structure is pressed into an attachment hole (not shown) of an attachment plate portion 92 placed at an upper side of the seat 91 of the airplane 90 in a state where the side of the leaf spring 80 (FIG. 1) is first pressed in, and is attached to the attachment plate portion 92. In this process, the circular plate portion 51 of the holder 50 is exposed on the front side of the attachment plate portion 92, and the illumination apparatus 10 is attached to the attachment plate portion 92 by, for example, a combining member (not shown) such as a clip and a screw penetrating through the circular plate portion 51 and the attachment plate portion 92.

According to the illumination apparatus 10 described above and the airplane 90 including the illumination apparatus 10, holding of the optical axis can be facilitated and the vibration endurance can be improved by the fitting structure of the recess 32 formed on the outer surface of the light source unit 12 and the protrusion 81a formed on the pressurizer 72. In addition, when the light source unit 12 is to be rotated, the recess 32 and the protrusion 81a can be released from the fitted state, and the light source unit 12 can be easily rotated while providing a click feeling to intermittently increase the holding force according to the position during movement. With this configuration, the direction of the optical axis can be changed while not excessively increasing the operation force of the user, and the holding force of the optical axis after the change can be improved.

In addition, because the protrusion 81a is formed in the first contact region T1 of the pressurizer 72 and the plurality of recesses 32 are formed on the portions, of the outer surface of the light source unit 12, that can contact the first contact region T1, manufacturing is easier in comparison to a case where the relationship between the protrusion 81a and the recess 32 is reversed. When the recess is to be formed in the pressurizer unlike the present embodiment, because the back side end of the pressurizer protrudes, the height of the illumination apparatus tends to be increased. In the structure of the present embodiment, on the other hand, such a disadvantage can be prevented, and the height of the illumination apparatus 10 can be reduced.

Moreover, in the pressurizer 72, the second contact region T2, separated from the light source unit 12, is placed at a portion nearer to the end in the longitudinal direction than is the first contact region T1, and contacts the light source unit 12 in accordance with the deformation of the pressurizer 72. With this configuration, an excessive deformation of the illumination apparatus 10 when the light source unit 12 is pressed from the front side toward the back side can be suppressed, and pressure endurance can thus be improved. For example, as shown in FIG. 10, a direction of a force F applied from the light source unit 12 to the second contact region T2 is inclined with respect to the center axis O1, and thus, has a component force F1 in a direction parallel to the center axis O1 and a component force F2 in a direction orthogonal to the center axis O1. With this configuration, it becomes easier to receive the component force F2 by the walls 54a and 54b having high strength, and it becomes not necessary to excessively increase a thickness of a back side end of the pressurizer 72 where the force in the direction of the center axis O1 is received. Because of this, while the strength of the illumination apparatus 10 is increased, an excessive increase of an outer size of the illumination apparatus can be prevented. Therefore, it is not necessary to provide a reinforcement structure which holds the illumination apparatus 10 from the back side, on the back side of the attachment plate portion 92 (FIG. 11) which is the attachment unit, in order to endure a pressing force from the front side in the attached state of the illumination apparatus 10. Thus, the space on the back side of the attachment plate portion 92 can be saved, and work to attach the illumination apparatus 10 to the attachment plate portion 92 can be facilitated.

In addition, the second contact region T2 of the pressurizer 72 contacts the outer surface of the light source unit 12 at a portion of the arc shape cross section in accordance with the deformation of the pressurizer 72, and, in the state where the second contact region T2 is in contact with the outer surface of the light source unit 12, the non-contact region T3 separated from the outer surface of the light source unit 12 is placed between the first contact region T1 and the second contact region T2 on the light emission side of the pressurizer 72. With this configuration, when the light source unit 12 is pressed from the front side, an increase in the frictional force between the light source unit 12 and the pressurizer 72 can be suppressed, and the light source unit 12 can be easily moved to a predetermined position, for example, the center of the illumination apparatus 10.

Further, because the pressurizer 72 is formed by a combination of the leaf spring 80 and the resin structure 73, the pressurizer 72 having a spring force and a high strength can be easily manufactured. For example, when the pressurizer is formed by a metal plate only, it is difficult to increase the strength with respect to a force applied from the outside, but according to the structure of the present embodiment, the strength can be increased.

FIG. 12 is a diagram showing an illumination apparatus according to an alternative configuration of an embodiment of the present disclosure, viewing a center part of an outer surface of a light source body 30a of a light source unit 12a from the back side. In a structure of the present configuration, a center recess 32 serving as a recess, and a plurality of circular ring recesses 94a, 94b. 94c, and 94d having the same center axis matching the center axis O1, are formed in the light source-side contact region S at a portion near the center of the outer surface of the light source body 30a.

With reference to FIG. 7, the protrusion 81a formed on the leaf spring 80 of the pressurizer 72 can fit with the recess 32 and each of the plurality of circular ring recesses 94a. 94b, 94c, and 94d. In FIG. 12, a plurality of positions of the projection 81a when the direction of the optical axis in the light source unit 12a is changed in a plurality of stages are shown by two-dots-and-chain lines.

According to the structure of the present configuration, an angle of elevation, which is an inclination angle of the optical axis with respect to the center axis O1, can be easily changed in a plurality of stages. The other structures and operations of the present configuration are similar to those of the structure of FIGS. 1~11.

FIG. 13 is a diagram showing an illumination apparatus according to an alternative configuration of an embodiment of the present disclosure, and corresponding to FIG. 8. In the structure of the present configuration, a pressurizer 72a includes a resin structure 73a and a leaf spring 80a. Two end load receiving portions 74 of the resin structure 73a are connected by a connection portion 79 of an intermediate part in the width direction (direction into and out of the page of FIG. 13) of an intermediate part in the longitudinal direction of the resin structure 70a. No hole penetrating in the direction of the center axis O1 is formed in the connection portion 79. On a front side (lower side of FIG. 13) surface of the connection portion 79, the first contact region T1 is placed, and a protrusion 79a protruding in the front side is formed in the first contact region T1.

Further, the leaf spring 80a is locked in a groove 76a at the back side of the resin structure 73a, and the protrusion 81a protruding in the front side is formed at a center part of the body plate portion 81 of the leaf spring 80a. The protrusion 81a is fitted to the back side of the protrusion 79a of the connection portion 79, to reinforce the protrusion 79a. Alternatively, a configuration may be employed in which the protrusion is not formed on the body plate portion 81, and a gap is formed between the body plate portion 81 and the back side of the protrusion 79a of the connection portion 79. The protrusion 79a of the connection portion 79 is fitted to one of the plurality of recesses 32 formed on the outer surface of the light source body 30 of the light source unit 12. With this configuration, the leaf spring 80a pressurizes the light source unit 12 via the resin structure 73a.

According to the structure of the present configuration, the strength of the pressurizer 72a can be further increased, and with the combination of the leaf spring 80a and the resin structure 73a, the pressurizer 72a having a spring force and a high strength can be easily manufactured. In addition, by employing the resin structure 73a for the pressurizer 72a and applying a coating having a superior sliding property on the surface of the resin structure 73a, it becomes possible to increase distribution characteristics of the load and stability of the load during a rotation operation. The other structures and operations of the present configuration are similar to those of the structure of FIGS. 1-11.

FIG. 14 is a diagram showing an illumination apparatus 10a of an alternative configuration of an embodiment of the present disclosure, and corresponding to the upper half of FIG. 7. FIG. 15 is a diagram corresponding to FIG. 14, and showing a state in which a light source unit 12b is pressed toward the back side and contacts a second contact region T2 of a pressurizer 72b in the alternative configuration.

In the illumination apparatus 10a of the present configuration, the pressurizer 72b is formed by combining a resin structure 95 and the leaf spring 80. Similar to the structure of FIG. 13, with the pressurizer 72b, the leaf spring 80 presses the light source unit 12b via the resin structure 95 against the holder 50. The locking portion 83 of the leaf spring 80 is locked on a gate portion 55a connected to the back side of the holder 50. An outer circular ring rib 96 protruding at the front side and an inner circular ring rib 97 at an inner side of the outer circular ring ribs are formed and placed at a portion near a center of the front side surface of the resin structure 95. The inner and outer circular ring ribs 97 and 96 have the same center axis, which also matches the center axis O1. Each of the circular ring ribs 97 and 96 corresponds to the protrusion formed in the first contact region T1. A tip surface of each of the circular ring ribs 97 and 96 is on the same spherical surface.

On the other hand, a plurality of recess groups 100a and 100b are formed at the center part of the spherical surface portion of the outer surface of the light source body 30b of the light source unit 12b and the periphery thereof. The recess group 100b at the periphery is placed to surround the center recess group 100a. Each of the recess groups 100a and 100b includes an outer circular ring recess 101 and an inner circular ring recess 102 at an inner side of the outer circular ring recess. The inner and outer circular ring recesses 102 and 101 have the same center axis. Each circular ring recess 102 and 101 corresponds to the recess formed in the light source-side contact region S. In addition, the inner circular ring recess 102 can be fitted with the inner circular ring rib 97, and the outer circular ring recess 101 can be fitted with the outer circular ring rib 96.

In the pressurizer 72b, the second contact region T2 separated from the light source unit 12b is placed at a portion nearer to an end in the longitudinal direction (left and right direction of FIG. 14) than is the first contact region T1. More specifically, an arc shape protrusion 98 is formed at a portion near an end of the spherical surface portion formed in the front side surface (lower side surface of FIG. 14) of the resin structure 95. The arc shape protrusion 98 is formed to protrude toward the center of the spherical surface portion of the resin structure 95. The center side surface of the arc shape protrusion 98 is the second contact region T2. A curved surface having an arc cross section approximately matching the spherical surface portion of the outer surface of the light source body 30b is formed in the second contact region T2. Further, as shown in FIG. 15, when the light source unit 12b is pressed from the front side toward the back side, the pressurizer 72b is deformed, and the portion of the arc cross section of the second contact region T2 contacts the outer surface of the light source body 30b in accordance with the deformation. In this state, a non-contact region T3 separated from the outer surface of the light source unit 12b is placed between the first contact region T1 and the second contact region T2 at the front side of the pressurizer 72b.

As shown in FIG. 15, in the case of a home position in which the optical axis of the light emitting element 40 (refer to FIG. 7) matches the center axis O1 of the illumination apparatus 10a, at least a part of the second contact region T2 is placed at the front side which is the light emission side, with respect to a plane L2 passing through an outermost end E2 in the longitudinal direction of the back side surface at the center in the width direction (direction into and out of the page of FIG. 15) of the pressurizer 72b from the center point O2 of the spherical surface portion of the outer surface of the housing 13a. With this configuration, when the light source unit 12b is pressed by the pressurizer 72b from the front side of the light source unit 12b, the force applied from the light source unit 12b can be received more at the walls 54a and 54b having a high strength, and, consequently, the strength of the illumination apparatus 10a can be further increased.

According to the structure of the present configuration, the inner and outer circular ring ribs 97 and 96 can be fitted to the plurality of inner and outer circular ring recesses 102 and 101, so that the light source unit 12b can be more easily rotated and the optical axis can be more easily maintained after the rotation.

In addition, according to the structure of the present configuration, the outer circular ring rib 96 and the inner circular ring rib 97 are placed in the first contact region T1 and the tip surfaces of the circular ring ribs 96 and 97 are on the same spherical surface. Thus, it becomes easier, when the spherical surface portion of the outer surface of the light source body 30b contacts the ribs, to match the center of rotation of the light source unit 12b with the center of the spherical surface portion. Desirably, the spherical surface on which the tip surfaces of the circular ring ribs 96 and 97 are formed and the spherical surface portion of the outer surface of the light source body 30b approximately match each other. In addition, unlike a case where a protrusion having a front side end surface with a large area is employed as the first contact region, by employing the circular ring ribs 96 and 97 having a small width in the radial direction, it becomes possible to easily match the center of rotation of the light source unit 12b with the center point O2 of the spherical surface portion without excessively increasing a frictional resistance during rotation of the light source unit 12b. Alternatively, one of the outer circular ring rib 96 and the inner circular ring rib 97 may be omitted. In this case, a plurality of circular ring recesses corresponding to the shape of the circular ring ribs of the pressurizer are formed on the outer surface of the light source body. The other structures and operations of the present configuration are similar to those of the structure of FIGS. 1~11.

In the structure of FIGS. 14 and 15, a material of the pressurizer 72b is desirably a material which allows deformation when a load is applied, and which has a hardness to receive the load applied from the light source unit 12b at the first contact region T1 and the second contact region T2. In addition, the resin structure 95 may be employed for the pressurizer 72b and a coating having a superior sliding property may be applied to the surface, of the resin structure 95, which contacts the outer surface of the light source body 30b, so that the distribution characteristic of the load and the stability of the load during the rotation operation can be increased. Further, by employing rotationally symmetric structure with respect to the center axis O1 for the sliding ring 70 (refer to FIG. 7) which receives the load of the light source unit 12b and the inner and outer circular ring ribs 97 and 96, it becomes possible to stabilize the operation load of the light source unit 12b.

In the above-described configurations, a case is described in which the protrusion is formed in the first contact region of the pressurizer and a plurality of recesses are formed in the light source-side contact region of the light source unit. Alternatively, the sides where the protrusions and recesses are formed may be reversed. In this case, the number of recesses formed in the first contact region may be set smaller than the number of protrusions formed in the light source-side contact region.

Further, in the above-described configurations, a case is described in which the LED is used as the light emitting element, but the light emitting element of the light source unit is not limited to such a structure, and various light sources may alternatively be used such as, for example, an LED lightbulb, and an incandescent lightbulb.

Further, in the above description, a case is described in which the movable structure to which the illumination apparatus is attached is an airplane, but alternatively, the movable structure may be bullet trains or buses, and the illumination apparatus may be attached at the upper side of the seat.

Embodiments of the present disclosure including an embodiment believed to be the best embodiment have been described. It is understood that various modifications are possible for these embodiments. The subject matter disclosed in the present disclosure is practiced in various forms and embodiments, and is applied to various usages, only some of which are shown herein. The appended claims are intended to include any and all corrections and modifications within the true scope of the present teachings.

The invention claimed is:

1. An in-room illumination apparatus for a movable structure, the in-room illumination apparatus comprising:
 a light source;
 a holder that holds the light source; and
 a bridge that is connected to the holder and presses the light source against the holder, wherein the light source includes a spherical housing and a light emitting element, the light emitting element being inside the spherical housing, the bridge includes, at a center part, a first contact region which is configured to be in contact with an outer surface of the light source at all times during use of the in-room illumination apparatus, the light source includes, at the outer surface, a light source-side contact region that is configured to be in contact with the first contact region during the use of the in-room illumination apparatus, at least one recess and at least one protrusion, which are configured to fit together, are in the first contact region and in the light source-side contact region, the at least one recess is included in a first one of the first contact region and the light source-side contact region, while the at least one protrusion which is configured to fit together with the at least one recess is included a second one of the first contact region and the light source-side contact region, with the first one and the second one being different, and a number of the at least one recess and the at least one protrusion in the first contact region is different than a number of the at least one recess and the at least one protrusion in the light source-side contact region.

2. The in-room illumination apparatus for the movable structure according to claim 1, wherein
the bridge includes the at least one protrusion in the first contact region, and
the light source includes the at least one recess in the light source-side contact region.

3. The in-room illumination apparatus for the movable structure according to claim 2, wherein
the light source includes a plurality of recesses on the outer surface,
a central one of the plurality of recesses is at a center of the outer surface of the light source, and
non-central recesses of the plurality of recesses are located at a periphery of the central recess, on a plurality of circles having a same center axis.

4. The in-room illumination apparatus for the movable structure according to claim 2, wherein
the light source includes a plurality of circular ring recesses, having a same center axis, on the outer surface in the light source-side contact region, and
the at least one protrusion is configured to fit with each of the plurality of circular ring recesses.

5. The in-room illumination apparatus for the movable structure according to claim 1, wherein
the bridge includes a resin structure and a leaf spring, and
the leaf spring presses the light source against the holder via the resin structure.

6. The in-room illumination apparatus for the movable structure according to claim 5, wherein
the at least one protrusion is on the leaf spring, and
the at least one recess is on a portion, of the outer surface of the light source, that contacts the leaf spring.

7. The in-room illumination apparatus for the movable structure according to claim 6, wherein
two locking portions are on respective ends of the leaf spring, the two locking portions being bent in directions toward each other, an intermediate portion of the leaf spring is locked at a side, of the resin structure, opposite to a side of light emission of the light source, and
the two locking portions are locked to the holder.

8. The in-room illumination apparatus for the movable structure according to claim 1, wherein
the bridge includes a second contact region nearer to an end of the bridge in a longitudinal direction than the first contact region,
the second contact region is configured to be separated from the light source when the bridge is not deformed, and
the second contact region is configured to contact the light source in accordance with a deformation of the bridge.

9. The in-room illumination apparatus for the movable structure according to claim 1, wherein
the at least one protrusion includes a ring shaped rib in the first contact region.

10. The in-room illumination apparatus for the movable structure according to claim 1, wherein
the at least one protrusion includes a plurality of circular ring ribs, having a same center axis, in the first contact region.

11. The in-room illumination apparatus for the movable structure according to claim 8, wherein
the second contact region is configured to contact the outer surface of the light source in accordance with the deformation of the bridge, at a portion of an arc cross section of the bridge, and
in a state where the second contact region is in contact with the outer surface of the light source, a non-contact region of the bridge, that is separated from the outer surface of the light source, is between the first contact region and the second contact region on a light emission side of the bridge.

12. The in-room illumination apparatus for the movable structure according to claim 8, wherein
when an optical axis of the light emitting element matches a center axis of the in-room illumination apparatus, at least a part of the second contact region is on the light emission side with respect to a plane passing through an outermost end in a longitudinal direction of a surface on an opposite side from the light emission side at a center in a width direction of the bridge from a center point of a spherical surface on the outer surface of the light source.

13. A movable structure comprising:
the in-room illumination apparatus for the movable structure according to claim 1, wherein
the in-room illumination apparatus for the movable structure is disposed at an upper side of a seat.

14. The in-room illumination apparatus for the movable structure according to claim 1, further comprising:
a pressurizer, wherein
the pressurizer includes the bridge that presses the light source against the holder.

15. The in-room illumination apparatus for the movable structure according to claim 1, further comprising:
a leaf spring that, via the bridge, presses the light source against the holder.

* * * * *